Oct. 31, 1967 E. BRICHARD ETAL 3,350,187
PROCESS AND APPARATUS FOR THE HOMOGENISATION OF MOLTEN GLASS IN
THE CHAMBER CONNECTING THE REFINING FURNACE TO THE
WORKING COMPARTMENT
Filed Dec. 30, 1963
2 Sheets-Sheet 1

INVENTORS
EDGARD BRICHARD
EMILE PLUMAT
MARCEL DUPERROY
BY
John J. Hart
ATTORNEY

Oct. 31, 1967   E. BRICHARD ETAL   3,350,187
PROCESS AND APPARATUS FOR THE HOMOGENISATION OF MOLTEN GLASS IN
THE CHAMBER CONNECTING THE REFINING FURNACE TO THE
WORKING COMPARTMENT
Filed Dec. 30, 1963                                    2 Sheets-Sheet 2

INVENTORS
EDGARD BRICHARD
EMILE PLUMAT
MARCEL DUPERROY
BY
John J. Hart
ATTORNEY

United States Patent Office 3,350,187
Patented Oct. 31, 1967

3,350,187
PROCESS AND APPARATUS FOR THE HOMOGENISATION OF MOLTEN GLASS IN THE CHAMBER CONNECTING THE REFINING FURNACE TO THE WORKING COMPARTMENT
Edgard Brichard, Jumet, Emile Plumat, Gilly, and Marcel Duperroy, Jumet, Belgium, assignors to Glaverbel, Watermael-Boitsfort, Belgium, a Belgian company
Filed Dec. 30, 1963, Ser. No. 334,437
Claims priority, application Belgium, Jan. 8, 1963, 501,423, Patent 626,920
5 Claims. (Cl. 65—134)

The present invention is concerned with the homogenisation of molten glass, more especially the glass which is in the channel connecting the glass elaboration and refining furnace to the glass tapping or working compartment.

It is well known that molten glass is not a thermally homogeneous mass. The portions of the glass which have been subjected to a cooling at the surface of the mass or in contact with the cold walls of the chamber have become more dense and more viscous and have a tendency to descend towards the bottom, while the portions of the glass which are hotter and consequently are less dense and more fluid ascend towards the surface. Currents known as convection currents are thus formed in the glass mass, these currents having different directions and velocities.

On the other hand, the molten glass is no longer a homogeneous mass as regards its chemical composition, this being different, for example, in respect of the glass which is shielded from the flames at the bottom of the tank furnace chamber and that which is at the bath surface, directly exposed to the flames of the burners.

These thermal and chemical heterogeneities have scarcely any tendency to be resorbed and are maintained in the molten glass throughout its travel from the furnace to the tapping position, despite the changes in direction which are frequently imposed thereon with the intention of producing homogenisation, such as baffle plates, weirs, screens or siphons. Since the heterogeneities in the molten glass are shown in the finished products by defects, for example, by striations in the case of drawn window glass, the molten glass must be as homogeneous as possible at the time when it is withdrawn.

Consequently, it is not surprising that mechanical agitation means have already been proposed and used for mixing the glass mass before the withdrawal, for example rotatable agitators having a horizontal, vertical or inclined axis, said agitators being provided with blades inclined relatively to the axis, or curved helices, or a helical thread. For example, it is known to install batteries of agitators of this type in the channel of arrangements for the manufacture of coloured glass, in which the glass leaving the refining compartment has added thereto a coloured pigment in powder form, which has to melt in the glass and be uniformly distributed therein while the glass is travelling towards the withdrawal or working compartment.

However, mechanical agitation means have also been provided in the installations for the production of uncoloured glass. In this case, the said means must be able to produce the effect of mixing the lower layers with the upper layers of the glass travelling in a channel towards the withdrawal compartment. On the same basis, it has also been proposed to provide a chamber of circular form with a revolving agitator between the refining and withdrawal compartments for the glass.

The methods which provide for the mixing by mechanical agitators of the lower layers with the upper layers of the molten glass mass or batch as it is travelling towards the withdrawal compartment have, however, serious defects. The main defect consists in that it is not possible to take into account the existence of currents displacing the glass in different directions. It is in fact well known that there are two main currents in a feeding channel for molten glass, one of these currents, known as the "forward" current, constituting the upper part of the glass batch being directed towards the withdrawal or working compartment, while the other, known as the "rearward" current, is displaced beneath the first in the opposite direction. This rearward current is fed by the convection currents formed by the glass of the upper layer which is cooled, and for this reason, has become more dense and has descended to the bottom of the glass batch. The forward and rearward currents show appreciable differences in temperature and composition and the homogenisation thereof is all the more difficult as the agitators are only capable of turning at a moderate speed, in order not to entrain air into the glass along the shaft of the rotatable agitator. A complete mixing of the forward and rearward currents is thus difficult to achieve and would moreover result in the appearance of another disadvantage, which is that of causing impurities entrained by the rearward current to rise to the surface, such as granules originating from the disintegration of refractory materials or the debris of devitrified glass, which this current normally returns towards the hot zones of the furnace, to which they are digested by the glass, or remelted.

The process according to the invention enables the glass intended for withdrawal or tapping to be easily homogenised without encountering the difficulties and disadvantages to which reference has been made above. To this end, there is set up in the layer of glass travelling towards the withdrawal compartment and situated above a colder layer returning from this compartment, ascending currents which direct the glass from the lower part of the upper layer towards the surface in such a way as to homogenise the glass. Actually, the currents moving forward towards the withdrawal compartment and the currents which return therefrom are themselves not homogeneous and it is in fact found that the "forward" current of the thermal heterogeneities which, although less considerable than those which exist between the two currents, nevertheless have an unfavourable action of the quality of the final product. The ascending currents intentionally set up in the "forward" layer cause the rapid and complete disappearance of these heterogeneities.

The ascending currents are advantageously given such a fullness that the quantity of glass displaced by them is greater than that of the glass being displaced towards the working compartment. There is advantageously set up at the surface of the upper layer of the glass a current which causes the melting residue floating on the molten glass to flow back towards the melting zone, so as to prevent the said residues from reaching or passing beyond the homogenisation zone. The return current to the surface of the bath thus replaces a floating barrier and has with respect to this latter the advantage of not allowing the residues to accumulate before it, but of maintaining them in the hot melting zone, where they can be resorbed.

It has already been proposed to reduce the heterogeneities of the layer of currents flowing towards the withdrawal compartment for the glass by imparting either a transverse reciprocating movement or a circular movement to one or more fingers which dip into this layer; a relatively small movement is provided in order not to cause occlusions of air in the glass bath and not to disturb the lower layer of currents returning from the withdrawal compartment. The movements of these fingers are certainly able to break up the different heterogeneous streams which form the currents, but they can obviously not produce a homogenisation of the layer as quickly and completely as the ascending currents set up in the upper layer according to the present invention, and they are ineffective for removing from the homogenisation zone the residues which are floating on the glass bath.

One arrangement for carrying out the process according to the invention comprises propulsion elements which are immersed in the layer of glass travelling towards the withdrawal or working compartment and capable of causing in this layer an ascending movement of the glass, while intimately mixing the latter. These propulsion elements can be propellers or even helical screws with a wide thread, the length of which is advantageously substantially identical with that of the depth of the layer. They are mounted at the bottom ends of vertical shafts which carry at their upper ends a transmission member controlled by a horizontal rotating shaft.

According to a first embodiment of the invention, the horizontal shaft and the transmission members are arranged above the arch of the channel and the vertical shafts extend through the said arch. This arrangement offers the advantage of causing the transmission members to function under normal thermal conditions and of permitting easy access to these members, for the normal maintenance thereof or for quickly changing the speed of rotation of the shafts or certain of the latter if the running conditions of the installation make this necessary.

In another embodiment, the horizontal shaft and the transmission members are situated beneath the arch and above the glass bath. They are then preferably enclosed in a chamber which is cooled for example by an air stream with the object of protecting them from the action of the furnace atmosphere. The horizontal shaft is preferably tubular and traversed by a cooling fluid, such as air or water, this making it possible to use a single shaft of great length without danger of deformation caused by the intense heat obtaining above the molten glass.

In all cases, the elements capable of setting up the ascending currents are disposed at a small distance from one another, so that together they are effective over the entire width of the channel. They can be placed along one or several lines, in this latter case, preferably in a staggered arrangement. The direction of rotation is normally the same for all the propulsion elements, but it is also possible to provide them with alternately opposite directions of rotation, the blades of the propellers or the helical thread of the screws being in this case disposed so as to produce ascending currents for all the propulsion elements.

Flat horizontal elements are arranged beneath the propulsion elements approximately at the level of contact between the glass layer travelling towards the withdrawal compartment and the layer returning from this compartment. These horizontal elements can be rotating circular plates fixed to the bottom ends of the vertical shafts, or fixed plates which are suspended from the members capable of causing the upward movement of the glass. They are intended to prevent the intake of portions of cold glass from the lower glass layer by means of the propulsion elements. An arrangement is already known which consists in arranging a separation between the upper "forward" layer and the lower "rearward" layer, said separation being disposed transversely in the channel and comprising openings near the walls of the latter, the said openings having arranged therein agitators which operate simultaneously and in opposite directions on the upper layer and the lower layer in order to increase the velocity of the currents travelling near the channel walls with a view to making this velocity similar to that of the currents travelling in the middle of the channel. The separation arrangement positioned between the two layers has no other effect than to vary the action of the agitators on each of the layers. It is not intended to increase the homogeneous nature of the upper layer or to create ascending currents, and in practice it is not able completely to prevent an addition to the upper layer of cold glass from the lower layer by the agitators, thus increasing the heterogeneous nature of the upper layer.

The parts which are in contact with the molten glass, particularly the propulsion members, the vertical shafts and the plates disposed beneath the propulsion members are preferably made of a heat-refractory material which is neutral with respect to the molten glass, such as molybdenum, the melting point of which is higher than 2600° C.

Several embodiments of the invention are illustrated by way of example in the accompanying drawings.

Figure 1:
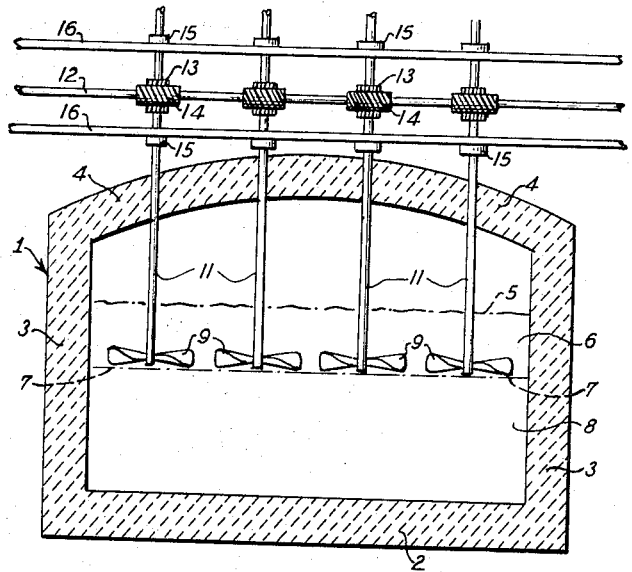
FIGURE 1 is a transverse section of a channel bringing the molten glass from the melting tank towards the glass withdrawal compartment, this channel being provided with an arrangement according to the invention, the transmission members thereof being disposed above the arch.

The channel 1 is formed by a base 2, walls 3 and the the arch 4. The molten glass 5, which is adapted to be displaced in the channel from the melting and refining tank for the glass to the compartment where the glass is withdrawn or worked (not shown in the figures) comprises essentially two currents in opposite directions, the current in the upper layer 6 moving towards the withdrawal compartment and the other, separated from the layer 6 by a neutral zone of small thickness, represented in the figures by a broken line 7, in the lower layer 8 comprising the colder glass returning from the withdrawal compartment and travelling towards the melting furnace. The upper layer 6 covers approximately one-third and the layer 8 approximately two-thirds of the depth of the molten glass mass.

According to the invention, strong ascending currents are set up in the upper layer 6 by means of propulsion members. By way of example, these can be formed by propellers 9 (FIGS. 1 and 3) having two or even more blades, or by screw-type agitators having a wide helical thread 10 (FIG. 2). The propulsion members are keyed on vertical shafts 11 which carry at their upper ends a transmission member capable of being actuated by another member fixed on a horizontal control shaft 12, for example a helically toothed pinion 13 which is driven by an endless screw 14. The vertical shafts 11 rotate in bearings 15 mounted on a member 16 which also carries the control apparatus.

Figure 2:
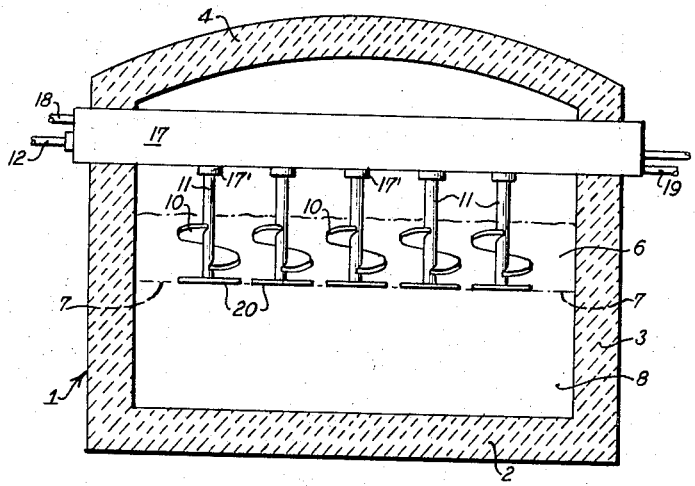
FIGURE 2 is a transverse section of a channel provided with an arrangement according to the invention, the transmission members of which are disposed beneath the arch.

In the embodiment according to FIG. 1, the member 16 and the control apparatus are situated above the arch 4 and the shafts 11 extend through the latter. In another embodiment (FIG. 2), the member and the control apparatus are disposed beneath the arch and are then enclosed in a casing 17 comprising fluid-tight joints 17′ for the passage of the shafts 11. The casing is adapted to be cooled by fluid, for example air, which is introduced through the conduit 18 and discharged through the conduit 19. In order to avoid the danger of the horizontal shaft 12 being deformed under the action of heat, it is advantageous to use a tubular shaft which is traversed by a cooling fluid, such as air or water. The positioning of the control apparatus in a casing beneath the arch offers the advantage of being able substantially to shorten the vertical shafts 11 and of being able better to guide the propulsion members.

Figure 3:
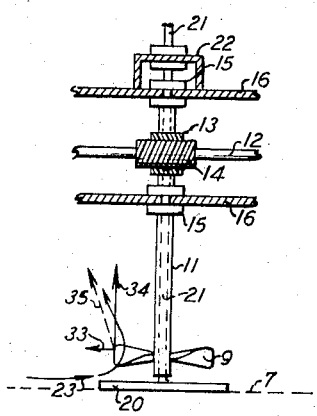
FIGURE 3 is a diagrammatic view showing one method of fixing the plate situated beneath a propulsion member.

In order to limit the downward action of the propulsion members and to avoid the inclusion in the upper glass layer of the colder glass originating from the lower layer, provision is made for positioning plates 20 (FIGS. 2 and 3) beneath the propulsion members. The said plates can be fixed at the level of the neutral zone 7 to the lower ends of the shafts 11 and turn with the latter (FIG. 2), but they are advantageously made immovable, for example by keying them on the rods 21 which extend through the hollow shafts 11 and are fixed on the U-shaped bracket members 22 mounted on the member 16 (FIG. 3).

The propulsion members 9 or 10, the shafts 11 and the plates 20 are made of a material which is resistant to heat and to the molten glass, preferably a metal such as molybdenum.

Figure 4:
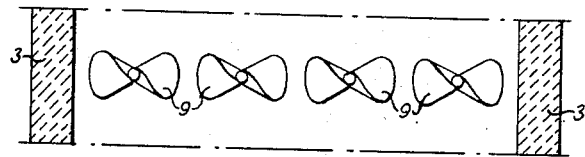
FIGURES 4 to 6 show different possibilities of arranging the propulsion members.
Figure 5:
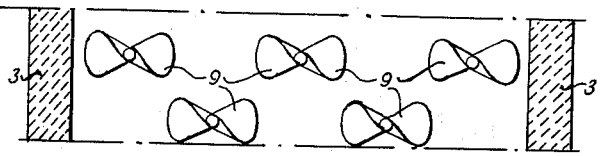
Figure 6:
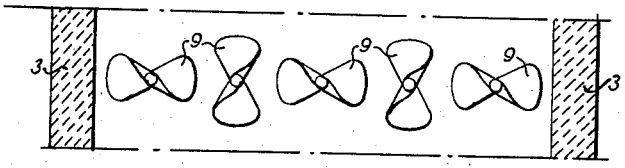

The propulsion members are provided in any required number for producing ascending currents over the entire width of the upper glass layer. They can be aligned in one row (FIG. 4) or staggered in two rows (FIG. 5), so that the operative areas of the propulsion units are in juxtaposition or that these areas are partially superimposed (FIG. 6).

Figure 7:
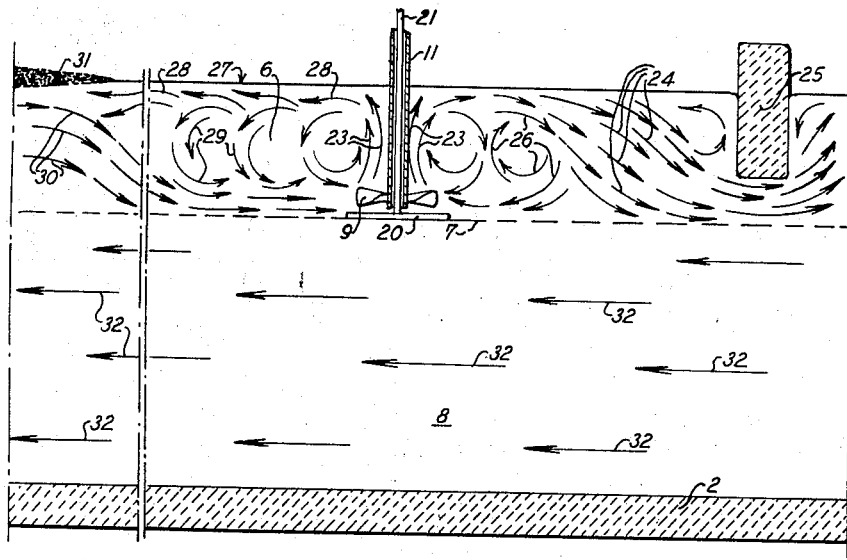
FIGURE 7 represents the current existing or produced by the propulsion members in the channel, seen as a vertical longitudinal section.

The assembly of the propulsion members produces ascending currents of a fullness of breadth such that the quantity of glass displaced by them is greater than that of the glass being moved towards the working compartment. As shown in FIG. 7, the ascending currents 23 originate from circular eddies which are produced downstream and upstream of these members. As indicated in FIG. 3 of the drawings, the blades of the propellers 9 exert on the molten glass a radial centrifugal action 33 which is proportional to the square of the rotational speed, and a vertical ascending action 34 which is proportional to the speed rotation and to the form of the propeller blade. Because the created ascending action 34 is preponderant, the resulting action 35 is nearly vertical. Each propeller blade therefore exerts an upward pressure on the glass situated above the same and draws in the glass which is around the propeller to give the currents produced thereby the direction indicated by the arrows 23 in FIGS. 3 and 7. Downstream, the molten glass raised by the currents 23 from the lower part of the layer 6 to the surface of the latter and homogenised at this juncture forms currents 24 which extend towards the withdrawal compartment. In order to attenuate the residual eddies which can still exist in the currents 24, these latter are caused to pass beneath a barrier 25. A small portion of the currents 24 is entrained by the eddies towards the bottom of the layer (arrows 26) and again encounters the propulsion members.

On the upstream side, the ascending currents 23 form currents 28 near the surface 27 of the layer 6, said currents 28 being directed towards the melting furnace. Currents 29 are detached from the said currents 28, and descend towards the base of the layer 6 and cause the flow of glass 30 coming from the melting tank to descend and advance in the lower part of the layer 6 towards the propulsion members, where they encounter the circular currents 26 from downstream, in order to form with these latter the ascending currents 23 moved by the propulsion members. As the currents 28 are directed near the surface 27 towards the hot zone of the melting furnace, they meet the unmelted residues 31 floating on the surface of the molten glass and prevent these residues from advancing towards the zone of the propulsion members, causing them to be maintained in the hot zone where they are finally resorbed.

Thus, because of their fullness, the ascending currents 23 exert their favourable action from two sides of the propulsion members. Downstream, they homogenise the glass intended to be withdrawn in the working compartment and upstream they form a barrier to the residues floating on the molten glass.

The lower glass layer 8 is essentially formed by colder glass currents 32 returning from the withdrawal compartment towards the furnace.

It is obvious that the invention is not limited to the embodiments which have been described and illustrated by way of example and no departure from the scope thereof would be involved by the incorporation of modifications.

We claim:

1. In the process of homogenising molten glass in the channel connecting the glass elaboration and refining furnace to the glass withdrawal or working compartment, the molten glass contained in such channel being constituted of an upper layer of hot glass flowing from the furnace to the working compartment and a lower, deeper layer of cooler molten glass returning from the working compartment to the furnace, the step of propelling only the molten glass in the upper layer at a plurality of localized places above the level of contact between the two layers and across the width of the channel to create in the molten glass of said upper layer a plurality of ascending spiralling currents capable of directing the molten glass from the lower part of said upper layer towards the surface of said upper layer, and in the upper portions of said upper layer causing currents of homogenised glass from such upper layer to flow upstream toward the furnace and to flow downstream toward the working compartment.

2. The process of claim 1, in which the propelling step is carried out with such intensity that the ascending currents are given a fullness sufficient to cause the quantity of molten glass upwardly displaced by them in said upper layer to be greater than that moving in said upper layer toward said working compartment.

3. The process of claim 2, in which the propelling step is carried out with an intensity sufficient to cause the current of molten glass flowing in the upper portion of said upper layer in an upstream direction to be of sufficient strength to prevent residues floating on the molten glass in such furnace being carried by said upper layer from the furnace.

4. Apparatus for homogenising molten glass in the channel connecting the glass elaboration and refining furnace to the glass withdrawal or working compartment, the molten glass contained in such channel being constituted of an upper layer of hot glass flowing from the furnace to the working compartment and a lower, deeper layer of cooler molten glass returning from the working compartment to the furnace, including a plurality of impeller propulsion members disposed across the width of said channel and wholly immersed in the molten glass of said upper layer, said impellers being located above the level of contact between said upper and lower layers and being so constructed that at given speed of rotation thereof each creates only in the molten glass of said upper layer an ascending spiralling current capable of directing the molten glass from the lower part of said upper layer towards the surface of said upper layer, and means for rotating said impellers to create such ascending currents.

5. Apparatus as defined in claim 4, including a plurality of flat horisontal elements located at approximately the level of contact between the two layers, each of said elements being positioned beneath one of said impellers and being of an area large enough to block the effects of the propulsion of its associated impeller from the molten glass in the lower layer.

References Cited

UNITED STATES PATENTS

| | | | |
|---|---|---|---|
| 2,569,352 | 9/1951 | Spigener | 65—178 X |
| 2,982,522 | 5/1961 | Hamilton et al. | 65—178 X |
| 3,053,517 | 9/1962 | Penberthy | 65—134 |
| 3,057,175 | 10/1962 | Rough et al. | 65—178 |
| 3,265,485 | 8/1966 | Carney et al. | 65—134 |

DONALL H. SYLVESTER, *Primary Examiner.*

R. BAJEFSKY, *Assistant Examiner.*